US012410037B2

(12) United States Patent
Sund

(10) Patent No.: US 12,410,037 B2
(45) Date of Patent: Sep. 9, 2025

(54) INCLINE ELEVATOR AND MODULAR DECK SYSTEM AND METHODS FOR THE ASSEMBLY, USE AND SHIPPING THEREOF

(71) Applicant: John Sund, Columbiaville, MI (US)

(72) Inventor: John Sund, Columbiaville, MI (US)

( * ) Notice: Subject to any disclaimer, the term of this patent is extended or adjusted under 35 U.S.C. 154(b) by 195 days.

(21) Appl. No.: 18/095,772

(22) Filed: Jan. 11, 2023

(65) Prior Publication Data

US 2023/0166945 A1 Jun. 1, 2023

Related U.S. Application Data

(63) Continuation of application No. 16/816,629, filed on Mar. 12, 2020, now Pat. No. 11,572,253.

(60) Provisional application No. 62/819,212, filed on Mar. 15, 2019.

(51) Int. Cl.

| | |
|---|---|
| ***E04F 15/02*** | (2006.01) |
| ***B63C 5/02*** | (2006.01) |
| ***B66B 7/02*** | (2006.01) |
| ***B66B 9/06*** | (2006.01) |
| ***B66B 19/00*** | (2006.01) |
| ***E02B 3/04*** | (2006.01) |

(52) U.S. Cl.

CPC .................. *B66B 9/06* (2013.01); *B63C 5/02* (2013.01); *B66B 7/02* (2013.01); *B66B 19/00* (2013.01); *E02B 3/04* (2013.01); *E04F 15/02194* (2013.01)

(58) Field of Classification Search

CPC ........ B63C 5/02; E02B 3/04; E04F 15/02183; E04F 15/02194; B66B 7/02; B66B 9/06

See application file for complete search history.

(56) References Cited

U.S. PATENT DOCUMENTS

| | | | | |
|---|---|---|---|---|
| 1,289,653 A | | 12/1918 | Castano | |
| 1,682,974 A | | 9/1928 | Lukens | |
| 2,156,777 A | * | 5/1939 | Duryea | B61D 23/00 52/180 |
| 2,278,554 A | * | 4/1942 | Morton | B61D 23/00 52/180 |
| 3,565,216 A | | 2/1971 | Gohlke | |
| 3,606,839 A | | 9/1971 | Stafford | |
| 3,760,740 A | | 9/1973 | Jacobs, Jr. | |
| 4,026,388 A | | 5/1977 | Creissels | |
| D258,465 S | * | 3/1981 | Studinski | D25/142 |
| 4,260,293 A | * | 4/1981 | Peterson | E02B 3/064 405/219 |
| 4,343,119 A | | 8/1982 | Bahnfleth | |

(Continued)

FOREIGN PATENT DOCUMENTS

| | | |
|---|---|---|
| AT | 402721 | 8/1997 |
| DE | 358956 | 9/1992 |

(Continued)

*Primary Examiner* — Paola Agudelo

(74) *Attorney, Agent, or Firm* — Crowell & Moring LLP

(57) ABSTRACT

An incline elevator system includes a pair of laterally spaced rails and a carriage configured with restraining members extending laterally beneath a bottom surface of the rail in a vertically spaced relationship therewith. A rail kit, together with methods of assembling the elevator system, is also provided. A modular deck system includes a plurality of box treads arranged in an array and a plurality of stanchions supporting the array. Methods of assembling the array of box treads are also provided.

13 Claims, 11 Drawing Sheets

(56) References Cited

U.S. PATENT DOCUMENTS

| | | | | |
|---|---|---|---|---|
| 4,352,597 | A * | 10/1982 | Kay | E02B 3/068 114/263 |
| 4,546,854 | A | 10/1985 | Bocker | |
| 4,550,806 | A | 11/1985 | Bocker | |
| 4,749,191 | A | 6/1988 | Gipson | |
| 4,759,162 | A * | 7/1988 | Wyse | E04H 3/24 52/126.6 |
| 4,909,153 | A | 3/1990 | Lacroix | |
| 5,142,991 | A * | 9/1992 | Theis | B66D 1/54 104/178 |
| 5,349,795 | A | 9/1994 | French et al. | |
| 5,408,790 | A * | 4/1995 | Hoesten | B65D 90/24 52/169.9 |
| 5,476,156 | A | 12/1995 | Gerber | |
| 6,082,061 | A | 7/2000 | Ryan | |
| D479,338 | S | 9/2003 | Hennessy et al. | |
| 7,380,376 | B2 | 6/2008 | Ohno et al. | |
| 7,503,146 | B2 * | 3/2009 | Thomas | E04F 15/02183 52/177 |
| D594,564 | S | 6/2009 | Disch et al. | |
| 7,908,802 | B2 | 3/2011 | Frederiksen | |
| 8,104,109 | B2 | 1/2012 | Juracek | |
| 8,302,362 | B2 | 11/2012 | Rischmueller et al. | |
| 8,627,926 | B2 * | 1/2014 | Gordon | E04F 11/02 182/115 |
| 9,038,780 | B2 | 5/2015 | Drew | |
| 9,279,256 | B2 | 3/2016 | Greaves et al. | |
| 9,376,820 | B2 | 6/2016 | Greaves et al. | |
| 9,656,766 | B2 | 5/2017 | Friedrich | |
| 2003/0066253 | A1 | 4/2003 | Lin | |
| 2012/0073902 | A1 * | 3/2012 | Honeycutt | E04G 1/17 182/113 |
| 2021/0332545 | A1 * | 10/2021 | Miller | B63C 5/02 |

FOREIGN PATENT DOCUMENTS

| | | | |
|---|---|---|---|
| DE | 202010011174 | U1 | 11/2010 |
| FR | 1334541 | | 6/1962 |
| WO | WO-2009059362 | A1 | 5/2009 |

* cited by examiner

INCLINE ELEVATOR AND MODULAR DECK SYSTEM AND METHODS FOR THE ASSEMBLY, USE AND SHIPPING THEREOF

This application is a continuation of U.S. application Ser. No. 16/816,629, filed Mar. 12, 2020, which application claims the benefit of U.S. Provisional Application No. 62/819,212, filed Mar. 15, 2019, both entitled Incline Elevator and Modular Deck System and Methods for the Assembly, Use and Shipping Thereof, the entire disclosures of which are hereby incorporated herein by reference.

FIELD OF THE INVENTION

The present application relates generally to an incline elevator and modular deck system, together with methods for the use, assembly and shipping thereof.

BACKGROUND

Bluffs are formed along the shores of various waterways, including oceans, lakes and rivers, or in various mountainous or hilly areas. Often, it is desirable to access a bottom of the bluff or hill from a location higher up on the bluff or hill, for example to provide access to and/or from a lodging or parking area. While various stair systems may be assembled along such bluffs or hills, traversing such stairs may not be possible for various persons, including those with disabilities. Likewise, repeated trips up and down such stair systems, or trips involving cumbersome loads, may be not be feasible even for able-bodied individuals.

To solve this problem, various incline elevator systems, or furnicular railways, may be installed on the bluff or hill to provide transportation between upper and lower locations by way of a carriage. The installation of such systems may be problematic, however, when located on relatively steep inclined surfaces, or where the ground surface is soft and susceptible to shifting, for example along sandy bluffs.

In addition, and due to the gravity induced descent encountered if various stop systems fail, it is important for such systems to ensure that the carriage stays on the tracks. Accordingly, there is a need for tamper proof systems that preclude derailment.

As can be appreciated, worksites where such incline elevator systems are installed may often be located at remote locations. As such, it may be difficult and expensive to ship/transport the appropriate building materials to the worksite.

In addition, it is often desirable to provide upper and lower deck systems providing access to such incline elevators. Often, such decks must be custom built, with underlying support beams, joists and/or truss structures. Such construction can be expensive and time consuming. In addition, such systems are not easily reconfigured or repaired, and are typically made of materials, such as wood, that wear over time under adverse weather conditions. Moreover, the surface of such systems may be slippery when wet, and cause erosion due to water run-off patterns created by the deck configuration.

SUMMARY

The present invention is defined by the following claims, and nothing in this section should be considered to be a limitation on those claims.

In one aspect, one embodiment of an incline elevator system includes a pair of laterally spaced rails. Each of the rails extends longitudinally and includes a head having an upper bearing surface and a support web extending downwardly from the head. The support web has inner and outer surfaces, while the head includes a bottom surface spaced below the upper bearing surface and positioned laterally inwardly from the inner surface of the support web. A carriage includes a laterally extending cross member and a pair of longitudinally extending and laterally spaced beams connected to the cross member. Each of the beams incudes a restraining member extending laterally beneath the bottom surface of the rail in a vertically spaced relationship therewith. Each of the restraining members is spaced laterally inwardly from the inner surface of a corresponding one of the rails. At least one roller is rotatably coupled to each of the beams and engaged with the upper bearing surface of one of the rails.

In another aspect, one embodiment of a method of assembling an incline elevator system includes installing a pair of rails in a laterally spaced relationship, with the rails each having a terminal end. The method further includes moving a carriage longitudinally relative to the terminal end of the rails and engaging an upper bearing surface of the rails with rollers while moving a restraining member beneath a bottom surface of each of the rails in a vertically spaced relationship therewith. Each of the restraining members is spaced laterally inwardly from an inner surface of a corresponding one of the rails.

In another aspect, one embodiment of a modular deck system includes a plurality of box treads, each having an upper wall, opposite side walls extending downwardly from the upper wall and opposite end walls extending downwardly from the upper wall. The plurality of box treads are arranged in an array, including at least some box treads arranged in a side-to-side relationship, and/or at least some box treads arranged in an end-to-end relationship. Abutting side walls of adjacent box treads are coupled with fasteners, and abutting end walls of adjacent box treads are coupled with fasteners. A plurality of stanchions support the array. Each of the stanchions is coupled directly to at least one end wall or at least one side wall of one of the plurality of box treads. The stanchions are the only structure supporting the array of box treads on the ground.

In one embodiment, the upper wall may be configured with a plurality of openings arranged in an array of elongated openings. In addition, the upper wall may be configured with a plurality of raised dimples arranged between the openings.

In yet another aspect, one embodiment of a method of assembling a modular deck system includes arranging a plurality of box treads in an array, wherein at least some of the box treads are arranged end-to-end and at least some of the box treads are arranged side-to-side, coupling abutting side walls of adjacent box treads with fasteners, coupling abutting end walls of adjacent box treads with fasteners, and supporting the array of box treads with a plurality of stanchions by coupling each of the stanchions directly to at least one end wall or at least one side wall of one of the plurality of box treads. In one embodiment, the stanchions are the only structure supporting the array of box treads.

A kit for assembling a rail system includes a plurality of rails each having a length, a height defined between an upper surface of a head and a bottom surface of a foot and a width defined between opposite sides of the head. The rails are stacked in a plurality of columns, each of the columns including a plurality of nested pairs of rails. Each of the nested pairs of rails includes a head of a first rail engaging a foot of a second rail and a foot of the first rail engaging a head of the second rail.

The various embodiments of the incline elevator system, modular deck system, kit for assembling a rail system and various methods for assembly and/or use, provide significant advantages over other incline elevator and/or deck systems. For example and without limitation, the restraining members ensure the carriage remains engaged with the rails, thereby avoiding derailment of the carriage from the rails. Because the restraining members are positioned inboard of the rails, and are integrally formed with the beams supporting the rollers, the system is tamper resistant, and the restraining members may not be removed or otherwise disengaged from the rails except by moving the carriage out of engagement at one of the terminal ends of the rail system.

The modular deck system also provides significant advantages. In particular, the box treads can be easily laid out in a desired array and connected together to provide a rigid, self-supporting structure that avoids the need for underlying joists and beams. In addition, the supporting stanchions can be driven into the ground at the desired locations and thereafter attached to the box treads, again foregoing the need for any underlying support structure. The system can be quickly and easily reconfigured simply by disconnecting adjacent box treads and installing new treads, or arranging the treads in a different array.

The configuration of the upper wall of the treads also provides various advantages. For example and without limitation, the configuration of the openings, including the shape, size and/or pattern thereof, allows for water run off while minimizing any erosion damage beneath the deck. The water run-off, combined with the raised dimples and a polyurea surface coating, provides an ideal non-slip surface suitable for use in all weather conditions.

The kit also provides significant advantages. For example, approximately 400 feet of rail may be shipped on a single pallet having an overall footprint of 1×4×8 feet.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

Figure 1A:
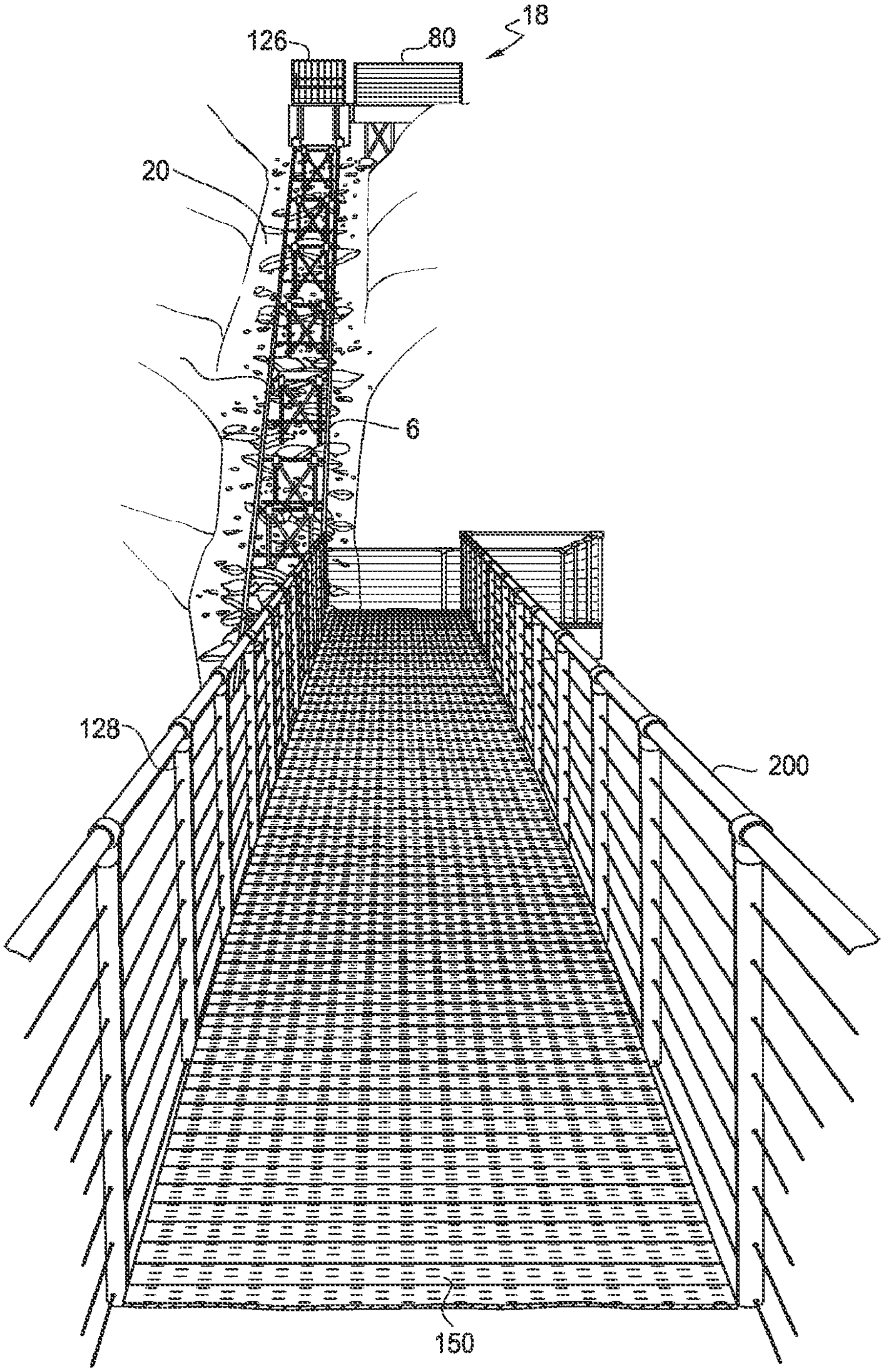
FIGS. 1A and B are views of an incline elevator system with upper and lower modular deck systems.

It should be understood that the term "plurality," as used herein, means two or more. The term "longitudinal," as used herein means of or relating to a length or lengthwise direction 2, for example a direction running along the length of a rail 6, beam 8 or modular box tread 10. The term "lateral," as used herein, means situated on, directed toward or running in a side-to-side direction 4, including for example between adjacent and parallel rails.

The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components. The terms "upper," "lower," "rear," "front," "side," "inner," "outer," "vertical," "horizontal," "right," "left," and variations or derivatives thereof, refer to the orientations as shown in the Figures from the perspective of a user or installer standing on or next to the feature being described. The term "transverse" means non-parallel. The term "outwardly" refers to a direction 12 facing away from a centralized location, for example a centerline 16 between a pair of rails (see FIG. 5). Conversely, the term "inwardly" refers to a direction 14 facing toward the centralized or interior location (e.g., centerline 16).

Incline Elevator System

Rails:

Referring to FIGS. 1A-5, an incline elevator system 18 is situated on an inclined surface 20, such as a bluff or hill. In various embodiments, the inclined surface 20 of the bluff or hill may have a maximum slope of 45 degrees. A plurality of stanchions 22 are embedded in the ground at predetermine longitudinal locations along the inclined surface 20, with the stanchions being maintained in a substantially vertical orientation. In one embodiment, pairs of laterally spaced stanchions 22 are spaced longitudinally along the slope of the inclined surface, for example at four foot intervals. It should be understood that in other embodiments, a single stanchion, or more than two stanchions, may be embedded at a predetermined longitudinal location. In one embodiment, the stanchion 22 is a tubular post, which has a cap 24 secured to an upper end thereof to prevent water intrusion. The stanchions may be embedded directly in the ground. In other embodiments, the stanchions may be embedded in a concrete pillar. The stanchions are preferably made of metal, for example and without limitation galvanized steel.

Figure 1B:
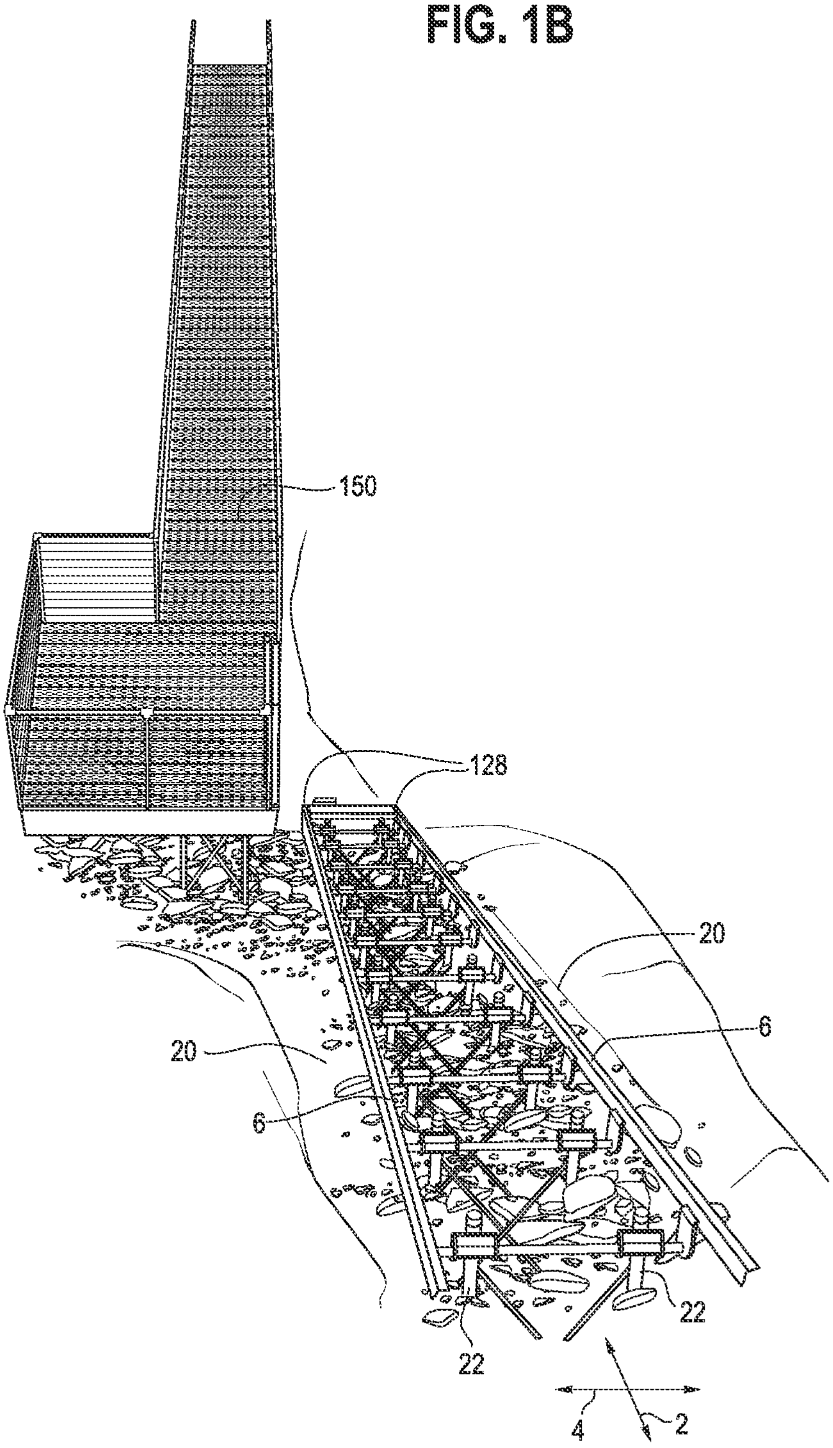
Figure 2:
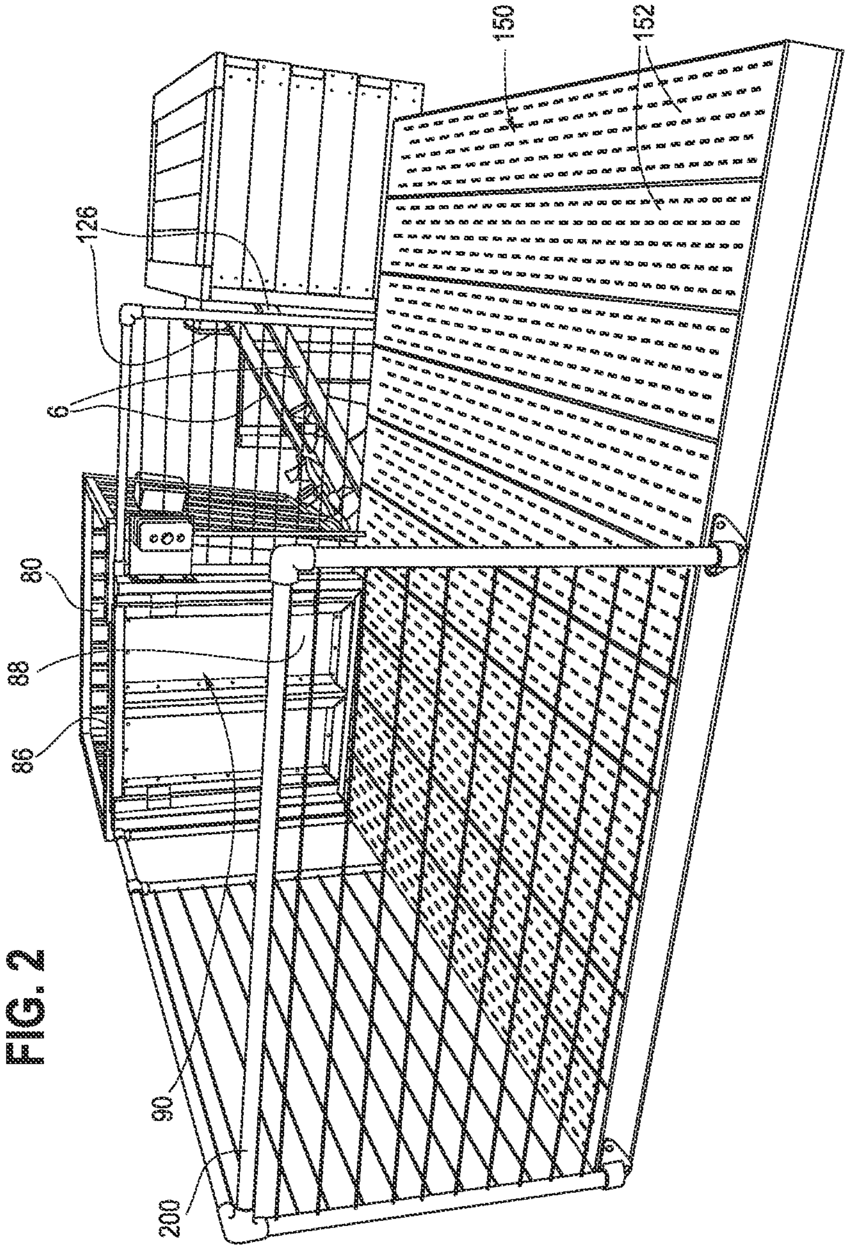
FIG. 2 is a top view of the upper modular deck system shown in FIG. 1.
Figure 3:
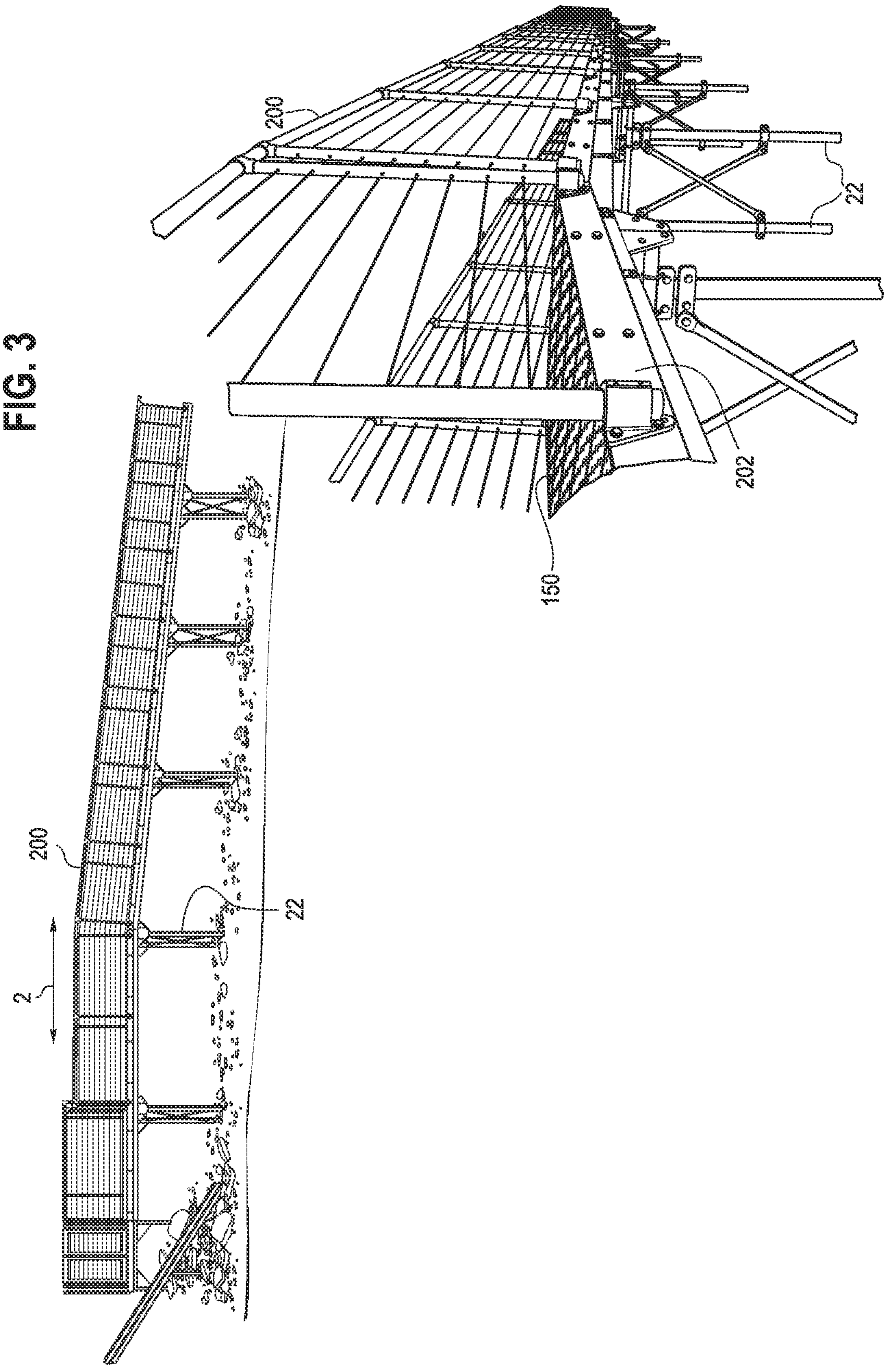
FIG. 3 is a side view of the lower modular deck system supported by stanchions.
Figure 5:
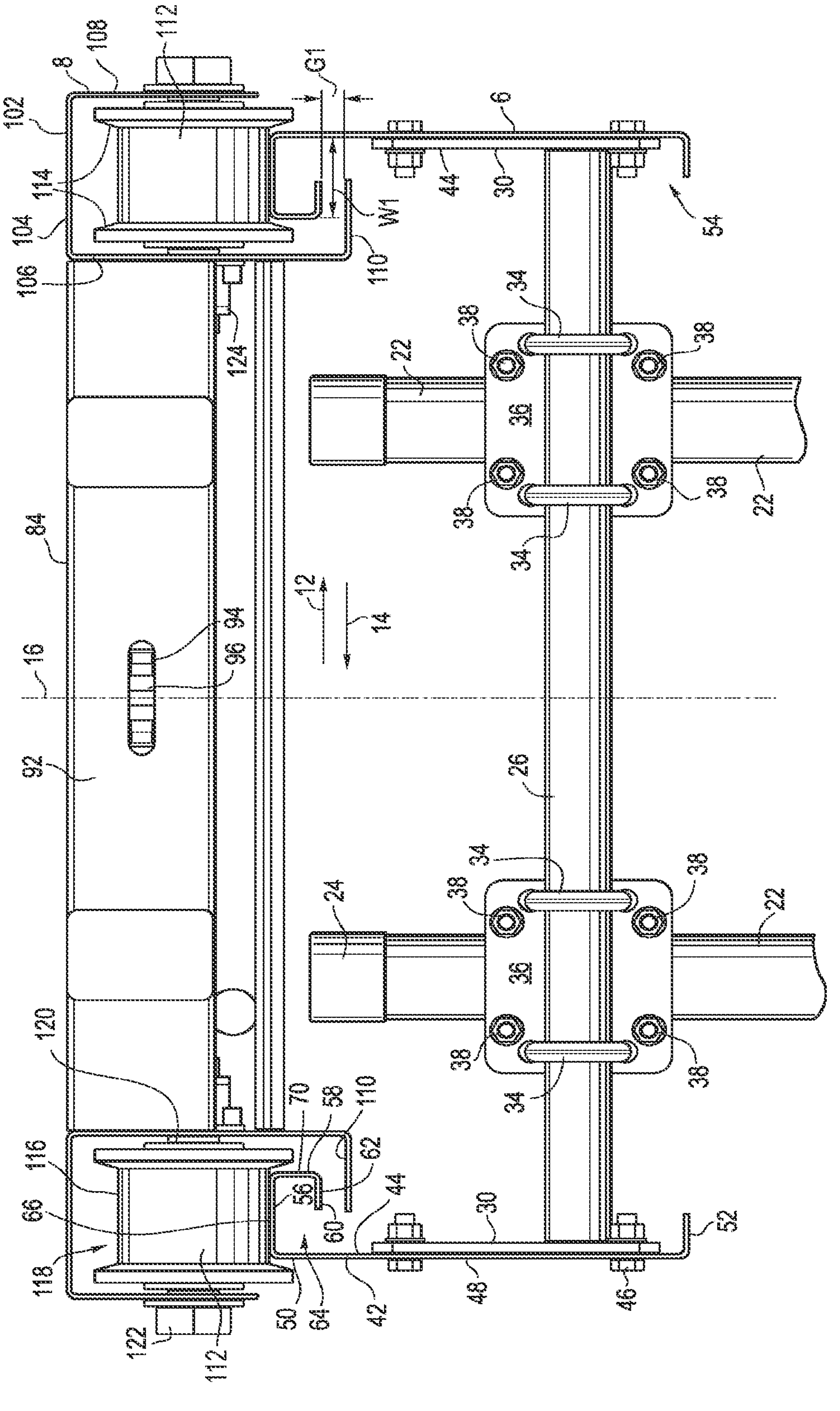
FIG. 5 is a front view of the carriage understructure positioned on a pair of rails supported by stanchions.
Figure 11:
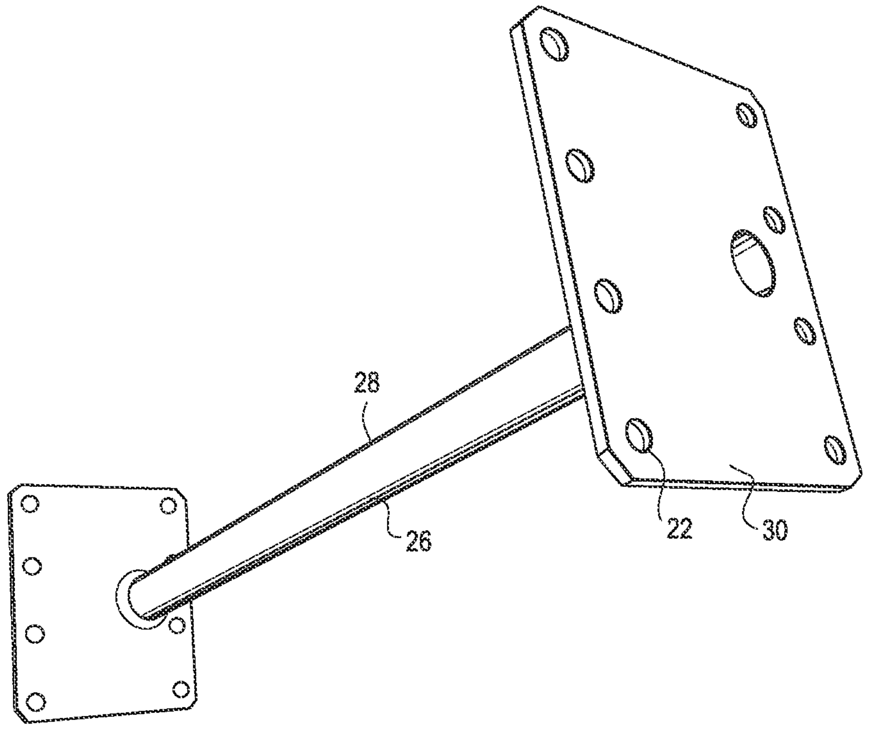
FIG. 11 is a perspective view of a spreader.

Referring to FIGS. 1, 5 and 11, a laterally extending spreader 26 is secured to each of the pairs of stanchions at each longitudinal location. The spreader 26 is maintained in a horizontal orientation. In one embodiment, the spreader 26 is configured with a laterally extending rod or tube 28 and a pair of laterally spaced end plates 30 secured to the opposite ends of the tube 28, for example by welding, as shown in FIGS. 5 and 11. In one embodiment, the tube 28 is coupled to the plates 30 off center, such that a greater portions of the plates 30 extend upwardly from the tube 28. Each plate 30 includes a plurality of fastener openings 32, shown for example as two vertically spaced rows of four openings 32. The spreader 26, including the tube 28 and plates 30, is preferably made of a rigid material, such as metal, including example and without limitation galvanized steel.

The spreader 26 may be connected to the one or more stanchions with one or more brackets, for example and without limitation two pairs of U-brackets 34. One pair of horizontally spaced U-brackets 34 (each in a vertical orientation) surrounds the rod 26, which is clamped between the U-brackets 34 and a back plate 36. Ends of the U-brackets are threaded and engaged with nuts 38. A second pair of vertically spaced U-brackets 34 (each in a horizontal orientation) surrounds the stanchion 22 and are coupled to the same back plate 36, again with ends of the U-brackets engaged with nuts 38. In this way, the stanchions 22 are coupled to the spreader 26, with the back plate 36 disposed therebetween.

Figure 4:
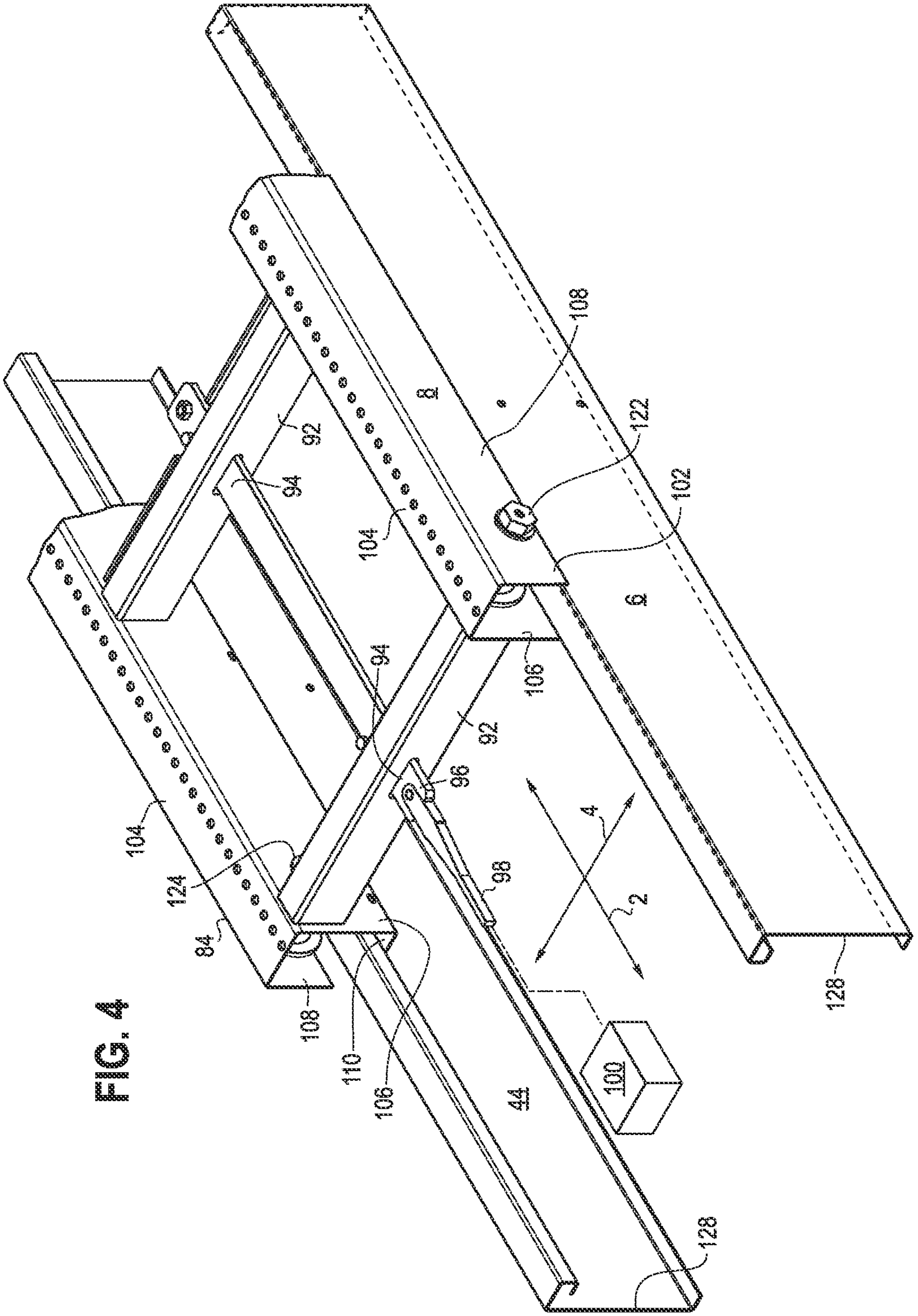
FIG. 4 is a perspective view of a carriage understructure.
Figure 6:
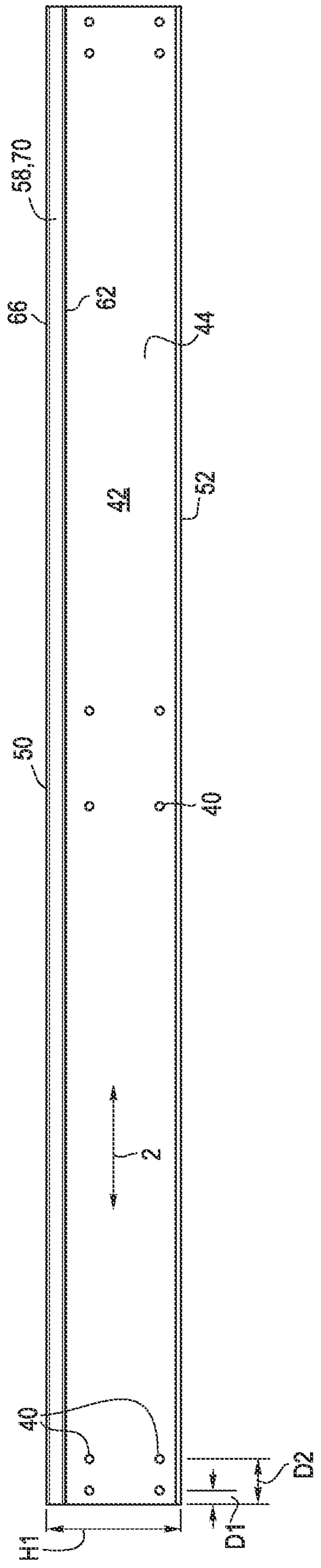
FIG. 6 is a side view of a rail section.

Referring to FIGS. 4-6, pairs of rails 6 are coupled to the spreader end plates 30. A plurality of rails 66 are arranged end-to-end in the longitudinal direction 4 along the overall length of the railway to form a railway. The rails 6 are made of metal, for example 11 Gauge galvanized steel. The end plate 30 of one spreader 26 overlaps and bridges between the abutting ends of longitudinally adjacent rails 6. The spreader plate 30 aligns and secures the abutting rails and thereby ensures that the upper bearing surfaces of the rails are contiguous. One of the spreaders 26 may also be secured to an intermediate location of the each rail 6. As shown in FIG. 6, the rails 6 are provided with a pair of four fastener openings 40 at an intermediate location that match the opening pattern in the spreader end plates, and has two pairs of vertically spaced openings at either a distance D1 or D2, for example at 1 inch and 3 inches. As such, the openings 32 in the spreader end plate may be aligned with the openings 40 at D1 on one rail and with the openings at D2 on an abutting, adjacent rail. Each end plate 30 is abutted against and secured to an inner surface 44 of a support web 42, for example with four bolts 46 engaged with nuts. The support web 42 has an outer surface 48. The spreader end plate 30 is nested between a head 50 of the rail arranged at the upper end of the support web and a foot 52 of the rail arranged at a lower end of the support web. The foot 52 may be configured as an inwardly or laterally extending flange. In other embodiments, the foot may be simply be configured as a terminal bottom edge of the support web 42. The head and foot define a channel 54 in which the spread end plate 30 is disposed. The modified C-channel cross section of the rail 6 provides increased bending strength and rigidity, allowing the rails to support and carry the load of the carriage. The head 50 includes an upper web 56, an inner side wall 58 extending downwardly from the upper web and a flange 60 extending outwardly from the inner side wall and defining a bottom surface 62 of the head. The inner side wall 58 of the head is spaced laterally inwardly from the inner surface 44 of the support web. The upper web 56 and the flange 60 define a space therebetween. In one embodiment, the flange 60 extends outwardly to an approximate centerline of the head, while the foot flange 52 extends inwardly to the same approximate centerline. The upper web of the head defines an upper bearing surface 66. As shown the support web 42 defines the outermost surface 48 of the rail.

Figure 7:
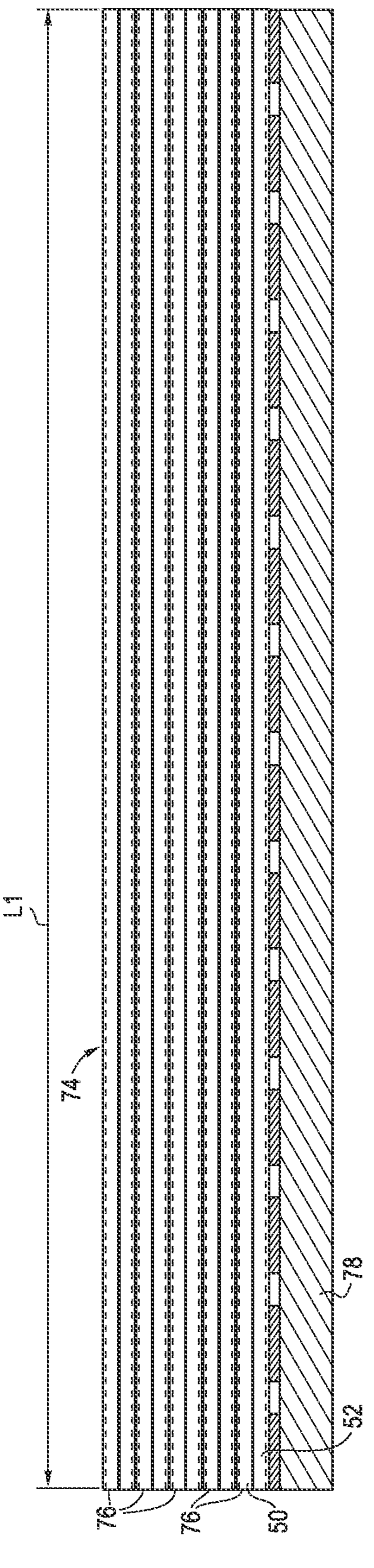
FIG. 7 is a side view of a rail system kit.
Figure 8:
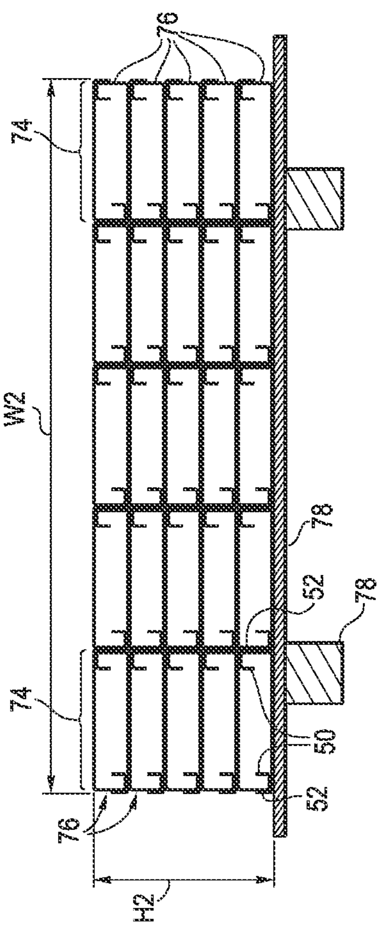
FIG. 8 is an end view of the rail system kit shown in FIG. 7.

Rail Kit:

Referring to FIGS. 6-8, a rail kit 68 for assembling a rail system includes a plurality of rails 6. The rails are stacked such that a large volume of rails may be easily shipped in a single standard shipping unit. For example in one embodiment, 400 feet of rails 6 may be shipped in a single shipping unit. Such a unit, or kit 68, would allow for a 200 foot installation (with two lines of laterally spaced rails), which encompasses the majority of residential and commercial incline elevator systems. The compact nature of the shipping unit, or kit 68, is accomplished by the unique shape and nesting arrangement of the rails. In particular, each of the rails has a length L1, a height H1 defined between the upper bearing surface of the head and a bottom surface of the foot, and a width W1 defined between opposite sides of the head (or between the outer surface 48 of the support web and the inner surface 70 of the inner side wall 58 of the head). It should be understood that a bottom surface 72 of the foot 52 may be defined as the bottom edge of the support web if the flange is omitted. In one embodiment, the rails 6 each have an overall length (L1) slightly less than 8 feet, for example 7 feet, 11⅞ inches. The height (H1) of each rail 6 is slightly less than 9 inches, for example 8.50 inches, while the width (W1) is slightly less than 2 inches, for example 1.94 inches.

In one embodiment, the rails 6 are stacked in a plurality of columns 74, with each of the columns including a plurality of nested pairs 76 of rails. Each nested pair of rails includes a head 50 of a first rail engaging a foot 52 of a second rail and a foot 52 of the first rail engaging a head 50 of the second rail. As disclosed herein, the support web 42 of each rail is contiguous with one of the sides of the head and extends between the head and the foot. As noted, the support web 42 has an outer surface 48 and an inner surface 44. The outer surface 48 of a lower rail of a first nested pair 76 is supported by an outer surface 48 of an upper rail of a second nested pair 76 positioned adjacent to and immediately below the first nested pair.

In one embodiment, the kit 68 includes five columns 74 of rails 6, with each column having five nested pairs 76 of rails. In this embodiment, the kit 68 has an overall length (L1) of eight feet or less, an overall width(W2) of four feet or less (e.g., 3 feet 6⅝ inches) and an overall height (H2) of one foot or less (e.g., 10¼ inches). As such, the kit 68 fits within the footprint of a standard skid 78 or pallet having a 4×8 feet dimension.

Carriage:

Referring to FIGS. 1A, B, 4 and 5, a carriage 80 includes a carriage body 82 coupled to and supported by a carriage understructure 84. The carriage body includes in one embodiment a floor 88, a seating surface 90 and a peripheral railing 86. The floor and seating surface may be maintained along a horizontal plane, while the understructure 84 is coupled thereto at an angle matching the angle of the underlying rails 6, for example with posts, braces or other structural members.

The carriage understructure 84 includes a plurality of laterally extending cross members 92 and longitudinally extending beams 102. The cross members have aligned apertures 94 formed therethrough along a centerline of cross members between the rails. A drive system, including for example a yoke 96, passes through the openings, and is engaged with the understructure. A chain or belt drive 98 is coupled to the yoke 96 and may be actuated to pull the carriage upwardly along the rails, or to permit a controlled descent of the carriage along the rails between upper and lower positions. A motor 100 is coupled to and actuates the drive 98.

A pair of parallel beams 102 are coupled to opposite ends of the cross members 92, for example by welding or with fasteners. Each beam is made of steel, for example galvanized steel. Each beam 102 is configured with a top wall 104 or web and inner and outer side walls 106, 108 or webs extending downwardly from the top wall. The inner wall 106 extends downwardly below the bottom surface 62 of the head 50. A restraining member 110, configured as a flange, extends laterally outwardly from the inner wall toward the inner surface 44 of the support web. The restraining member 110 extends laterally beneath the bottom surface 62 of head of the rail in a vertically spaced relationship therewith, defining a gap G1. The restraining members 110 of the laterally spaced beams are spaced laterally inwardly from the inner surfaces 44 of the rails.

At least one roller 112 (e.g., wheel), and preferably a pair of longitudinally spaced rollers, are rotatably coupled to each of the beams 8 and engaged with the upper bearing surface 66 of one of the rails. The roller 112 has laterally spaced circumferential lips or rims 114 that extend along opposite sides of the head 50, with the rims 114 and a bearing surface 116 defining a channel 118 that receives the bearing surface 66 of the rail head 50. The channel 118, or rims 114, has a depth greater than the dimension of the gap G1, such that the restraining member 110 will engage the bottom surface 62 of the head before the rim 114 can ride up over the bearing surface of the head. The head 50 of the rail is vertically captured between the rollers 112 and the restraining flange 110, which ensures that the rollers maintain engagement with the rails. The head 50 is also laterally captured between the rims 114. The rollers are secured to the beams with an axle 120 extending through the inner and outer walls, with a bolt head 122 engaging the outer wall and a nut 124 engaging the inner wall, with various washers installed on the bolt as deemed necessary. The rollers may be made of hard plastic, metal, rubber or other suitable materials.

Assembly:

A method of assembling the inclined elevator system includes installing a plurality of stanchions 22 at predetermined locations along the slope of the inclined surface 20. The stanchions 22 may be installed by driving one end into the ground a sufficient distance to anchor the stanchion. Spreaders 26 are coupled to the stanchions with brackets 34, 36. Pairs of rails 6 are connected to the spreaders 26 in a laterally spaced relationship, with a spreader bridging between and securing abutting ends of longitudinally adjacent rails. Each of the rails 6 extends in the longitudinal direction 2 along the inclined surface 20. The combination of each of the two laterally spaced rail systems, or the uppermost and lowermost rail on each side, define upper and lower terminal ends 126, 128 of the rail system.

The carriage 80 is aligned with one of the upper or lower terminal ends 126, 128, and is moved longitudinally, or in the longitudinal direction 2, relative to one of the terminal ends 126, 128 such that the rollers 112 engage the upper bearing surface 66 of the rails while the restraining members are 110 moved beneath the bottom surface 62 of each of the rails 6 in a vertically spaced relationship therewith. Each of the restraining members 110 is spaced laterally inwardly from the inner surface 44 of a corresponding one of the rails. In this way, the carriage is moveably installed and supported on the rail system. The carriage 80 cannot be removed from the rails except to move it longitudinally away from the upper or lower terminal end and off the rails. In other words, the restraining members 110, which are located between the rails and cannot be tampered with or removed, ensures that the carriage is safely secured to the rails and cannot be dislodged therefrom in either the vertical or lateral direction. In operation, the restraining member 110 engages the bottom surface 62 of the head if the roller is somehow caused to lift upwardly from the rail, and also engages the inner wall or surface of the rail head and/or support web if laterally displaced, with the engagement preventing the carriage 80 from derailing from the rails 6.

Modular Deck System

Referring to FIGS. 1A-3 and 9A-12, a modular deck system 150 includes a plurality of box treads 152. It should be understood that the modular deck system may be installed at any desired location, and is not required to be used with an incline elevator system, although it may be used with such systems, for example to provide an upper and lower ingress/egress for the inclined elevator system while also providing a walkway from the inclined elevator system to a waterfront or other attraction. Rather, the modular deck system is a stand-alone system, and may be installed adjacent a building structure, or by itself, for example as a dock or pier, wherever it is desired to provide a platform.

Each box tread includes an upper wall 154, defining a platform or deck/tread surface 160, opposite side walls 156 extending downwardly from the upper wall and opposite end walls 158 extending downwardly from the upper wall. The upper wall, side walls and end walls may be formed integrally, with each of the side walls and end walls folded along fold lines defined side and end edges 162, 164 of the box tread. A bottom edge of each of each of the side walls includes a flange 166 extending laterally inwardly to stiffen the side walls. The upper wall, side walls and end walls define a cavity. The height (H3) of the side walls, and end walls, is sufficient to ensure that the box tread has sufficient strength and resistance to bending, wherein the box tread is self-supported, and does not require additional underlying support (e.g., joists or beams). In one embodiment the height (H3) of the side walls and end walls is between 3 and 6 inches, and about 4 inches in one embodiment, with the flange 166 having a length of about 1 inch. In one embodiment, the box tread is made of 12 GA A-60 galvennealed steel. Depending on the thickness and type of material, the height of the treads may be altered without sacrificing the strength and resistance to deformation. Each box tread 152 is covered with a coating 168, for example a polyurethane and polyuria blend, which provides additional protection against the elements and contributes to a non-slip surface. In one embodiment, the coating is a 0.035 inch Vortex™ liner.

The upper wall 154, or tread surface, is configured with a plurality of openings 170, configured as elongate obround openings in one embodiment. In one preferred embodiment, the openings have a 0.234×1.190 OBR dimension. The openings may be arranged in longitudinally extending and laterally spaced rows 172. Adjacent rows may be staggered, such that an opening in one row is laterally spaced from a bridge portion 174 between two openings in an adjacent row, or with the matrix of openings forming diagonal columns of openings extending between the opposite side edges. In one embodiment, the overall length (L2) of the tread is approximately 48 inches (e.g. 4 feet). In various alternative embodiments, the overall length of the tread may be 1, 2, 3 or 5 feet. In an embodiment wherein L2 is 4 feet, five rows 172 of openings (58 total) are arranged in the upper wall, with three rows of 12 openings and 2 rows of 11 openings, with the centers of adjacent openings in each row spaced apart at 4 inches. It should be understood that the number of openings may be altered to accommodate box treads having other longitudinal lengths. It should be understood that openings having different shapes, dimensions, spacing and frequency may also be suitable. The openings 170, including the elongation, spacing and frequency thereof, ensures that sufficient drainage is provided to allow for quick and efficient water run-off, for example during a rain storm or if splashed with waves. At the same time, the opening size, spacing and frequency prevents concentrated run-offs that may cause erosion in the ground surface below the deck, as may be experienced for example by a traditional deck with planks spaced apart along the lengths thereof.

The upper wall 154, or tread surface, is also configured with a plurality of raised dimples 176, configured as dome shaped protuberances. The uppermost surface of the dimples may extend a distance H4 above the surface 160, with H4 being 0.080 inches in one embodiment. The dimples may have a central through-opening 178, or be closed. In one embodiment, the through opening 178 is 0.125 inches in diameter, while the overall dimple is circular in plan view and has a diameter or width (W3) of 0.375 inches and a height of 0.080 inches, with it being understood that other sizes and shapes of the openings may be suitable. The dimples 176 may be arranged in longitudinally extending and laterally spaced rows 180. Adjacent rows may be staggered, such that a dimple 176 in one row 180 is laterally spaced from a bridge portion 182 between two adjacent dimples in an adjacent row, or with the matrix of dimples forming diagonal columns of dimples extending between the opposite side edges. The angle of the diagonal columns of dimples is different than the angle of the diagonal columns of openings. In one embodiment, six rows 180 of dimples 176 (141 total) are arranged in the upper wall, with two outermost rows of dimples arranged between the outermost rows of openings and the side edges 162. Three rows of dimples 180 have 24 dimples, while the other alternating rows 180 are configured with 23 dimples, with the centers of adjacent dimples in each row spaced apart at 1 inch. It should be understood that the number of dimples may be altered to accommodate box treads having other longitudinal lengths. The dimples 176, including the height (H3), width, spacing and frequency thereof, ensure that a sufficient grip surface is provided and exposed to the user. It should be understood that dimples having different shapes, dimensions, spacing and frequency may also be suitable.

Figure 9A:
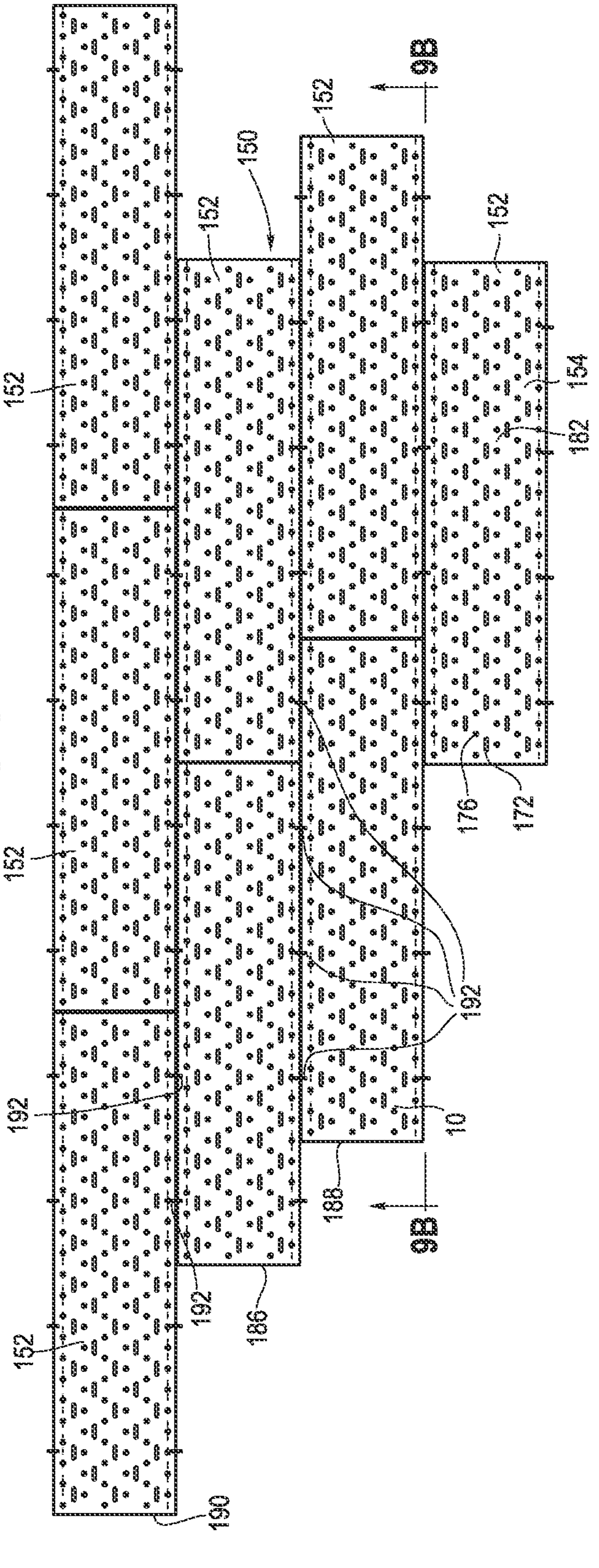
FIG. 9A is a top view of one exemplary modular deck array.
Figure 9B:
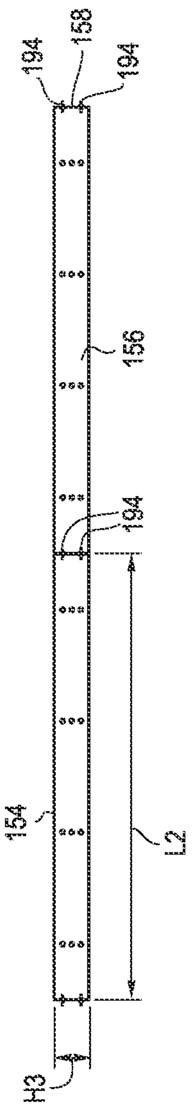
FIG. 9B is a side view of the modular deck array shown in FIG. 9A.
Figure 10B:
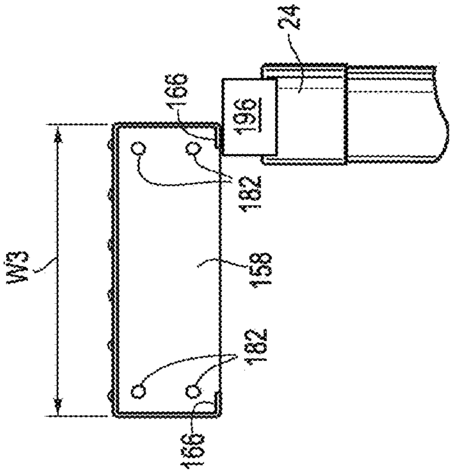
FIG. 10B is an end view of the modular box tread taken along line 10B-10B of FIG. 10A.
Figure 10A:
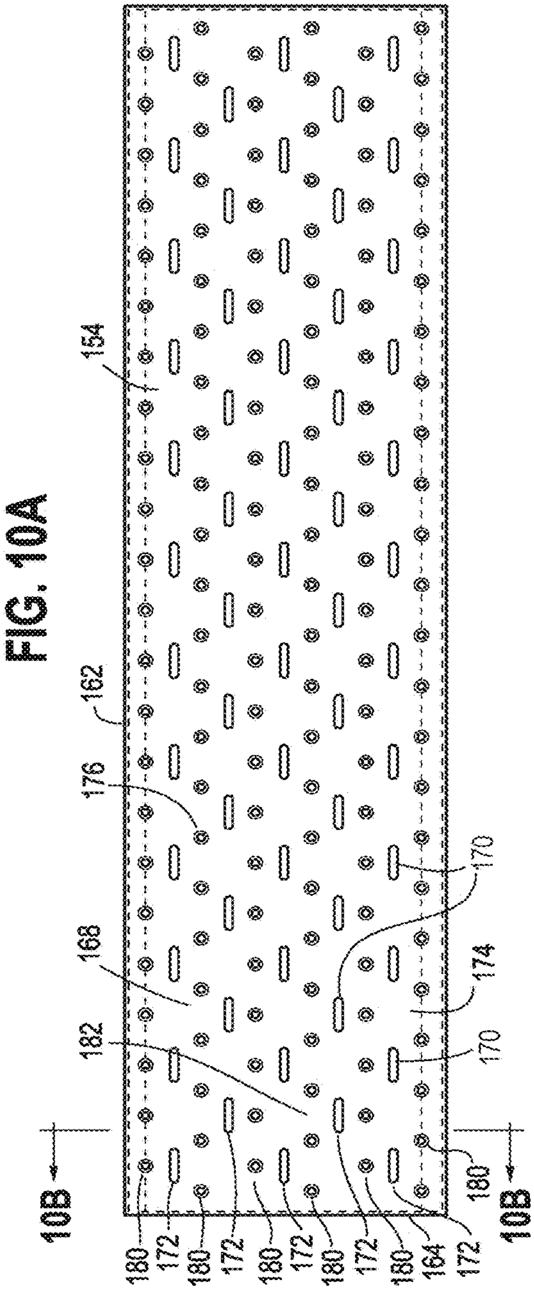
FIG. 10A is a top view of a modular box tread.

As shown in FIGS. 9A and 10A, the openings 170 and raised dimples 176 in combination define a pattern, with three dimples defining a triangular space in which the opening 170 is disposed.

Referring to FIG. 10B, the end walls 158 are configured with a plurality of fastener holes 182, for example two laterally spaced rows of two vertically spaced fasteners holes, each row having a 2 inch center spacing between holes and a 1 inch center to side edge spacing, with each of the bottom holes having a 1 inch center to bottom edge spacing.

Figure 10C:
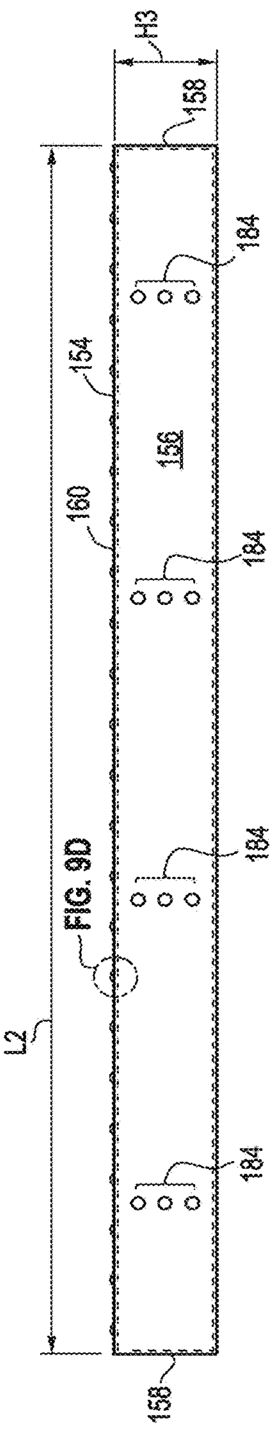
FIG. 10C is a side view of the modular box tread shown in FIG. 10A.
Figure 10D:
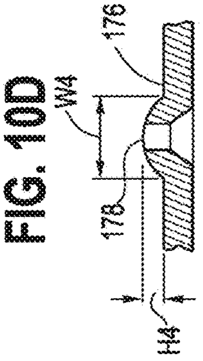
FIG. 10D is an enlarged view of a dimple formed on the upper surface of the box tread.

Referring to FIG. 10C, the side walls 156 are configured with a plurality of fastener holes 184, for example four rows of longitudinally spaced fasteners holes spaced apart at 12 inch intervals (and 6 inches between the end rows and end walls), with each row having three equally, and vertically, spaced openings.

Referring to FIGS. 9A and B, a plurality of box treads 152 may be arranged in an array, with the plurality of box treads arranged in side-to-side and end-to-end relationships. For example, a row 186, 188, 190 of box treads may be connected to end-to-end, with fasteners 194 secured through mating openings. Adjacent rows may then be secured one to the other at 12 inch intervals with fasteners 192 such that the openings 184 in the side walls are aligned, with the adjacent rows being staggered or aligned. Shorter box treads may be installed at the end of the run such that the overall lengths of adjacent runs are the same. Abutting side walls of adjacent box treads are coupled with fasteners, and abutting end walls of adjacent box treads are coupled with fasteners. The box treads may be coupled end-to-end to make any length, using any of the different lengths of box treads. In addition, adjacent runs of box treads may be bolted side-to-side in any position on 12 inch centers to provide various configurations.

If a box tread 152 becomes damaged, the box treads may be easily disassembled simply by removing the fasteners 192, 194, and replacing the box tread 152. Likewise, if it is desired to reconfigure the deck in a new array, the fasteners 192, 194 may be removed, with the positioning of the box treads 152 altered to the new configuration and reconnected. In some embodiments, the same stanchions can be used to support multiple arrays. Alternatively, the stanchions can be moved, and/or new stanchions installed, to support a new array.

A plurality of stanchions 22 may be secured to the array using U-brackets 34 in order to support the array above the ground. The stanchions are driven into the ground and are arranged in a predetermined pattern to be aligned with the side walls and/or end walls of the array of box treads, wherein after each of the stanchions is coupled directly to at least one end wall 158 or at least one side wall 156 by a fastener 196 that may be embodied as a U-bracket 34 or other fastener known in the art. The stanchions are the only structure supporting the array of box treads. In one embodiment, the stanchions are configured the same as the stanchions used to support the rail system. The connected box treads provide sufficient bending strength between the stanchions such that no additional underlying joist or beam structure is needed. A facing 202, configured as a thin plate, may be secured to the box treads around the periphery of the array defining the modular deck. In addition, a railing 200 may be secured to the modular deck, for example to the facing and/or the end or side walls of various box treads arranged around the perimeter of the array.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A modular deck system comprising:

a plurality of box treads each comprising an upper wall, opposite side walls extending downwardly from the upper wall and opposite end walls extending downwardly from the upper wall, wherein the plurality of box treads are arranged in an array, with the plurality of box treads arranged in a side-to-side and end-to-end relationship, wherein abutting side walls of adjacent box treads are coupled with fasteners, and wherein abutting end walls of adjacent box treads are coupled with fasteners; and a plurality of stanchions supporting the array, wherein each of the stanchions is coupled directly to at least one end wall or at least one side wall of one of the plurality of box treads, wherein the stanchions are the only structure supporting the array of box treads, and wherein at least some of the box treads are not connected directly to a stanchion.

2. The modular deck system of claim 1 wherein the upper wall comprises a plurality of elongated openings.

3. The modular deck system of claim 2 wherein the elongated openings each have an obround shape.

4. The modular deck system of claim 2 wherein the plurality of openings are arranged in an array comprising laterally spaced rows of longitudinally spaced openings.

5. The modular deck system of claim 4 wherein adjacent rows of openings are staggered.

6. The modular deck system of claim 4 wherein the upper wall further comprises a plurality of raised dimples arranged in laterally spaced rows between the rows of openings.

7. A method of assembling a modular deck system comprising:

arranging a plurality of box treads in an array, wherein at least some of the box treads are arranged end-to-end and at least some of the box treads are arranged side-to-side, wherein each of the box treads comprises an upper wall, opposite side walls extending downwardly from the upper wall and opposite end walls extending downwardly from the upper wall;

coupling abutting side walls of adjacent box treads with fasteners;

coupling abutting end walls of adjacent box treads with fasteners; and supporting the array of box treads with a plurality of stanchions by coupling each of the stanchions directly to at least one end wall or at least one side wall of one of the plurality of box treads, wherein the stanchions are the only structure supporting the array of box treads and wherein at least some of the box treads are not connected directly to a stanchion.

8. The method of claim 7 further comprising driving the stanchions into the ground.

9. The method of claim 7 wherein the upper wall comprises a plurality of elongated openings.

10. The method of claim 9 wherein the elongated openings each have an obround shape.

11. The method of claim 9 wherein the plurality of openings are arranged in an array comprising laterally spaced rows of longitudinally spaced openings.

12. The method of claim 11 wherein adjacent rows of openings are staggered.

13. The method of claim 12 wherein the upper wall further comprises a plurality of raised dimples arranged in laterally spaced rows between the rows of openings.

* * * * *